US010509435B2

United States Patent
Krithivas et al.

(10) Patent No.: US 10,509,435 B2
(45) Date of Patent: Dec. 17, 2019

(54) PROTECTED REAL TIME CLOCK WITH HARDWARE INTERCONNECTS

(71) Applicant: Intel Corporation, Santa Clara, CA (US)

(72) Inventors: Ramamurthy Krithivas, Chandler, AZ (US); Mark A. Bordogna, Andover, MA (US); James M. Sepko, Coplay, PA (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 15/279,535

(22) Filed: Sep. 29, 2016

(65) Prior Publication Data

US 2018/0088625 A1    Mar. 29, 2018

(51) Int. Cl.
    *G06F 1/14*     (2006.01)
    *G06F 1/12*     (2006.01)
    *G06F 21/72*    (2013.01)
    *G06F 11/34*    (2006.01)

(52) U.S. Cl.
    CPC ............... *G06F 1/14* (2013.01); *G06F 1/12* (2013.01); *G06F 21/725* (2013.01); *G06F 11/3419* (2013.01)

(58) Field of Classification Search
    CPC .......... G06F 1/14; G06F 1/12; G06F 11/3419; G06F 27/725
    See application file for complete search history.

(56) References Cited

U.S. PATENT DOCUMENTS

| 5,570,397 A * | 10/1996 | Kubista ............... G06F 1/04 327/144 |
| 8,327,448 B2 | 12/2012 | Eldar et al. |
| 8,560,453 B2 | 10/2013 | Pendakur et al. |

(Continued)

FOREIGN PATENT DOCUMENTS

WO    2012003504 A2    1/2012

OTHER PUBLICATIONS

Introduction to Distributed Clock Synchronization and the IEEE 1588 Precision Time Protocol—Publish date Sep. 15, 2016; 3 pages; retrieved from http://www.ni.com/tutorial/2822/en/ on Apr. 4, 2017.

(Continued)

*Primary Examiner* — Terrell S Johnson
(74) *Attorney, Agent, or Firm* — Patent Capital Group

(57) ABSTRACT

Disclosed herein are systems and methods for initializing and synchronizing a protected real time clock via hardware connections. For example, in some embodiments, a protected real time clock on a trusted execution environment may initialize via a hardware connection to a master clock, which is synchronized to a trusted time source via a hardware connection. In some embodiments, a protected real time clock on a trusted execution environment may initialize to a master clock during a system hardware reset sequence. In some embodiments, before a system is running normally, a real time clock on an integrated Intellectual Property agent may initialize and synchronize to a protected real time clock via a hardware connection. In some embodiments, after a system is running normally, a real time clock on a discrete device may initialize and synchronize to a protected real time clock via a hardware connection.

25 Claims, 7 Drawing Sheets

(56) References Cited

U.S. PATENT DOCUMENTS

| | | |
|---|---|---|
| 9,760,114 B1* | 9/2017 | Gopalakrishnan ........ G06F 1/12 |
| 2004/0128528 A1 | 7/2004 | Poisner |
| 2005/0160272 A1 | 7/2005 | Teppler |
| 2005/0207387 A1* | 9/2005 | Middleton ............ H04J 3/0664 |
| | | 370/347 |
| 2006/0248596 A1 | 11/2006 | Jain et al. |
| 2008/0104433 A1 | 5/2008 | May et al. |
| 2008/0243950 A1 | 10/2008 | Webman et al. |
| 2010/0011214 A1* | 1/2010 | Cha ....................... G06F 21/725 |
| | | 713/175 |
| 2013/0138858 A1 | 5/2013 | Adler et al. |

OTHER PUBLICATIONS

PCI-SIG Engineering Change Notice—Mar. 31, 2013—retrieved from https://pcisig.com/sites/default/files/specification_documents/ECN_PTM_Revision1a_31_Mar_2013.pdf on Apr. 4, 2017.

\* cited by examiner

PROTECTED REAL TIME CLOCK WITH HARDWARE INTERCONNECTS

TECHNICAL FIELD

The present disclosure relates to a protected real time clock, and more particularly, to systems and methods for initializing and synchronizing a protected real time clock, and for initializing and synchronizing a real time clock to the protected real time clock.

BACKGROUND

The field of electronic security has become significant in today's society as consumers and businesses are increasingly reliant on electronic technology to conduct transactions and enable interactions. A key issue associated with conducting transactions and enabling interactions is the maintenance of accurate time. Maintaining accurate time is necessary for the security of a computer system as well as transactions via security certificates and timestamp verifications. Unauthorized users may gain access to a computer system by altering the system time either directly or remotely by software, viruses, and worms. Establishing a protected real time clock that provides for secure initialization and synchronization is necessary.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure. Common elements in different FIGURES may have a common identifier.

DETAILED DESCRIPTION

Disclosed herein are systems and methods for initializing and synchronizing a protected real time clock via hardware connections. For example, in some embodiments, a protected real time clock on a trusted execution environment may initialize via a hardware connection to a master clock, which is synchronized to a trusted time source via a hardware connection. In some embodiments, a protected real time clock on a trusted execution environment may initialize to a master clock during a system hardware reset sequence. In some embodiments, before a system is running normally, a real time clock on an integrated Intellectual Property agent may initialize and synchronize to a protected real time clock via a hardware connection. In some embodiments, after a system is running normally, a real time clock on a discrete device may initialize and synchronize to a protected real time clock via a hardware connection.

The systems disclosed herein enable the secure initialization and synchronization of a protected real time clock and real time clocks within a system via hardware connections. Unlike previous approaches to securing a protected real time clock, various embodiments of protected real time clock systems disclosed herein provide for secure initialization and synchronization via hardware connections and without host software intervention.

Typically, a computer system includes a real time clock (RTC), which is a battery-powered clock in a microchip in a computer motherboard. The microchip is often referred to as "the CMOS" (complementary metal-oxide semiconductor) since it is usually separate from the microprocessor and other chips. A small memory on the CMOS stores current time values stored by the RTC, including the year, month, date, hours, minutes, and seconds. After the computer boots up, the Basic Input-Output Operating System (BIOS) reads the current time from the memory in the CMOS. The RTC runs on a special battery or other power storage device that is not connected to the normal power supply, so the RTC keeps track of the time even when a computer is turned off to maintain a persistent time. Malicious software (malware) may alter the RTC current time values during boot up, so the RTC on the CMOS may not be a trusted time source. Typically, other RTC in a system may be adjusted by a user or another source, so it may not be a trusted time source. Unlike a RTC, a protected real time clock (PRTC) does not function when the computer is off and may be initialized when the computer is powered on.

Figure 1A:
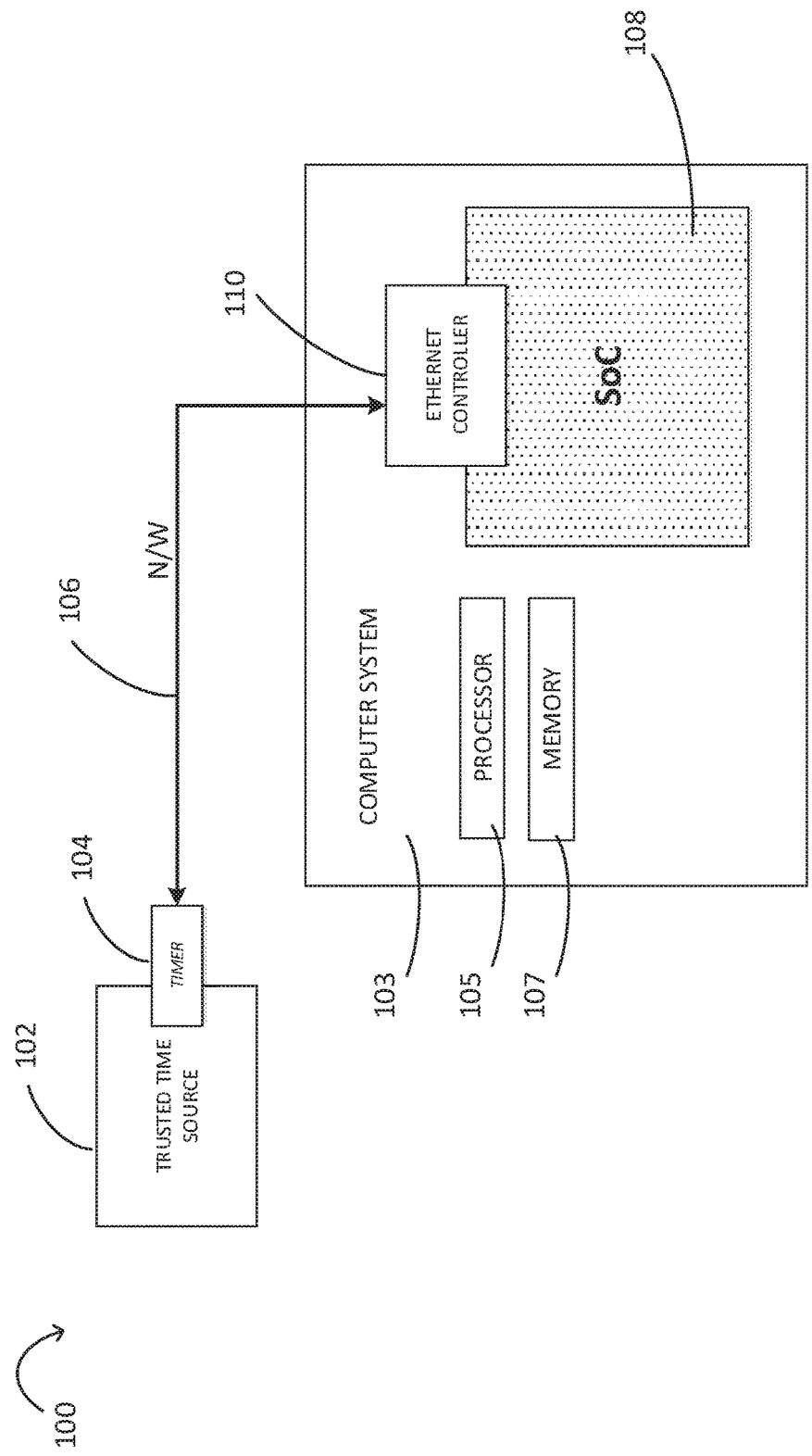
FIG. 1A is a simplified block diagram of an exemplary platform for initializing and synchronizing a protected real time clock via a hardware connection, in accordance with various embodiments.

FIG. 1A is a simplified block diagram of an exemplary system for initializing and synchronizing a PRTC. System 100 may include a computer system 103, a trusted time source 102 with a timer or counter 104, a network 106, and a system on a chip (SoC) 108 with an Ethernet controller 110. In some embodiments, the network may include connections other than Ethernet, such as T1/E1, OTN or other transport technologies.

Computer system 103 may be any computer system, such as a desktop, laptop, smartphone, server, networking apparatus, or the like. As used herein, system, computer system and platform may be used interchangeably. Computer system 103 may include one or more processors 105, and one or more memory elements 107, among other elements. The one or more processors 105 may execute any type of instructions associated with the node to achieve the operations detailed herein this Specification. The one or more processors may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, software, firmware, or combinations thereof, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. A system may include a chipset (not shown) for controlling communications between one or more processors and one or more of the other components of the node. The processors may also include one or more application specific integrated circuits (ASICs) or application specific standard products (ASSPs) for handling specific data processing functions or tasks.

The one or more memory elements 107 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory may store program instructions that are loadable and executable on the processor(s) as well as data generated or received during the execution of these programs, including, for example, real time clock data. The memory may include one or more operating systems (O/S) application software.

Network 106 may include local-area networks (LAN), wide-area networks (WAN), combinations of LAN's or WAN's, such as the Internet, or the like. System 100 may communicate with trusted time source 102 via network 106. In some embodiments, network connections may include T1/E1, optical transport networking (OTN), passive optical networks (PON), among others. A network controller may manage communications across the network. Network 106 may include a hardware connection from a trusted time source 102 to the Ethernet controller 110.

A trusted time source 102 may be any known trusted time source. One example of a trusted time source is IEEE 1588 grandmaster clock. IEEE 1588 is a standard protocol to synchronize heterogeneous clocks connected via a network, such as Ethernet, with high accuracy using a hierarchical master-slave architecture for clock distribution. See, for example, http://www.ni.com/tutorial/2822/en/. Heterogeneous clocks have varying characteristics, such as frequency rate and stability, that may cause the clocks to keep different time. IEEE 1588 defines a protocol known as the precision time protocol (PTP). Under PTP, a time distribution system consists of one or more communication networks (or segments), and one or more clocks. An ordinary clock is either the source of (master) or destination for (slave) a synchronization reference. The master node may have one or more connections to slave devices, as the network may require one master source to synchronize many slaves simultaneously. A slave device may "listen" to multiple masters for redundancy purposes, but accepts its timing from one master source. A boundary clock may have functionality that represents an ordinary clock master and slave clock simultaneously. Therefore, a boundary clock may accept timing from a master device (i.e., a trusted time source) through its slave port and may synchronize to the master. Subsequently, this boundary clock device may act as a master on other ports and relay timing downstream to other clocks, such as a PRTC or a RTC. A boundary clock may accurately synchronize one network segment to another. A master clock is selected for each network segment. The root timing reference is called the grandmaster clock, also referred to herein as the trusted time source. The grandmaster clock transmits synchronization information to the clocks residing on its network segment. The boundary clocks with a presence on that segment then may relay accurate time to the other segments to which they are also connected. In some embodiments, a simplified PTP system may consist of ordinary clocks connected to a single network, and no boundary clocks are used. In some embodiments, a slave clock is moved to a master port using other proprietary methods rather than a boundary clock. A grandmaster is elected and all other slave clocks synchronize directly to it. IEEE 1588 provides a standard way of determining the clock to be used as the time source for the entire network to initialize and frequently synchronize its clocks. Although the figures show a boundary clock in the embodiment depicted, it will be understood by one of ordinary skill in the art that a system does not require a boundary clock.

In addition to IEEE 1588 as the method for synchronizing heterogeneous clocks in a network, other methods may be used, such as a combination of Synchronous Ethernet and IEEE 1588. In such a case, the physical layer clock may be recovered via Synchronous Ethernet and may be used as the clock source for IEEE 1588, then IEEE 1588 may be used for phase recovery only. Other examples of synchronizing to a trusted time source include T/E lines and stratum clocks.

As used herein, the term initialization refers to a clock resetting its time directly or indirectly to a master clock and becoming frequency and phase synchronized. As used herein, the term synchronization refers to a clock frequently adjusting its time to correct for clock drift when maintaining time with another clock that counts time at a different rate. When synchronizing its time, a clock may adjust its time according to a timer 104 to maintain the same time as a trusted time source. As used herein, timer and counter may be used interchangeably. Timer 104 may be a register with a clock input that comes from a local oscillator. Typically, a clock synchronizes time by adjusting its timer to change oscillations in accordance with the master clock which leads the slave clock to appear to count at the same rate and be in phase alignment. Techniques for frequency and phase alignment are known in the art.

SoC 108 may be an integrated circuit that integrates all components of a computer or other electronic system into a single chip connected by a bus. SoC may contain digital, analog, mixed-signal, and often radio-frequency functions. SoC typically may consist of one or more microcontrollers, microprocessors or digital signal processor (DSP) cores, memory elements including ROM, RAM, EEPROM and/or flash memory, timing sources including oscillators and phase-locked loops, peripherals including counter-timers, real-time timers and power-on reset generators, external interfaces including USB, FireWire, Ethernet, USART, SPI, and analog interfaces such as ADCs and DACs, and voltage regulators and power management circuits, among others. It will be understood by persons of ordinary skill in the art that the present disclosure may apply to any compute platform or data center platform having hardware connections to a master clock, and is not limited to a SoC.

SoC 108 may include an Ethernet controller 110, which may include a Media Access Control (MAC) chip and a physical layer (Phy) for Ethernet interfacing with SoC 108. Ethernet controller 110 may be integrated with SoC 108 or may be on system 100 platform discrete from SoC 108. Preferably, Ethernet controller 110 is integrated with SoC 108.

Figure 1B:
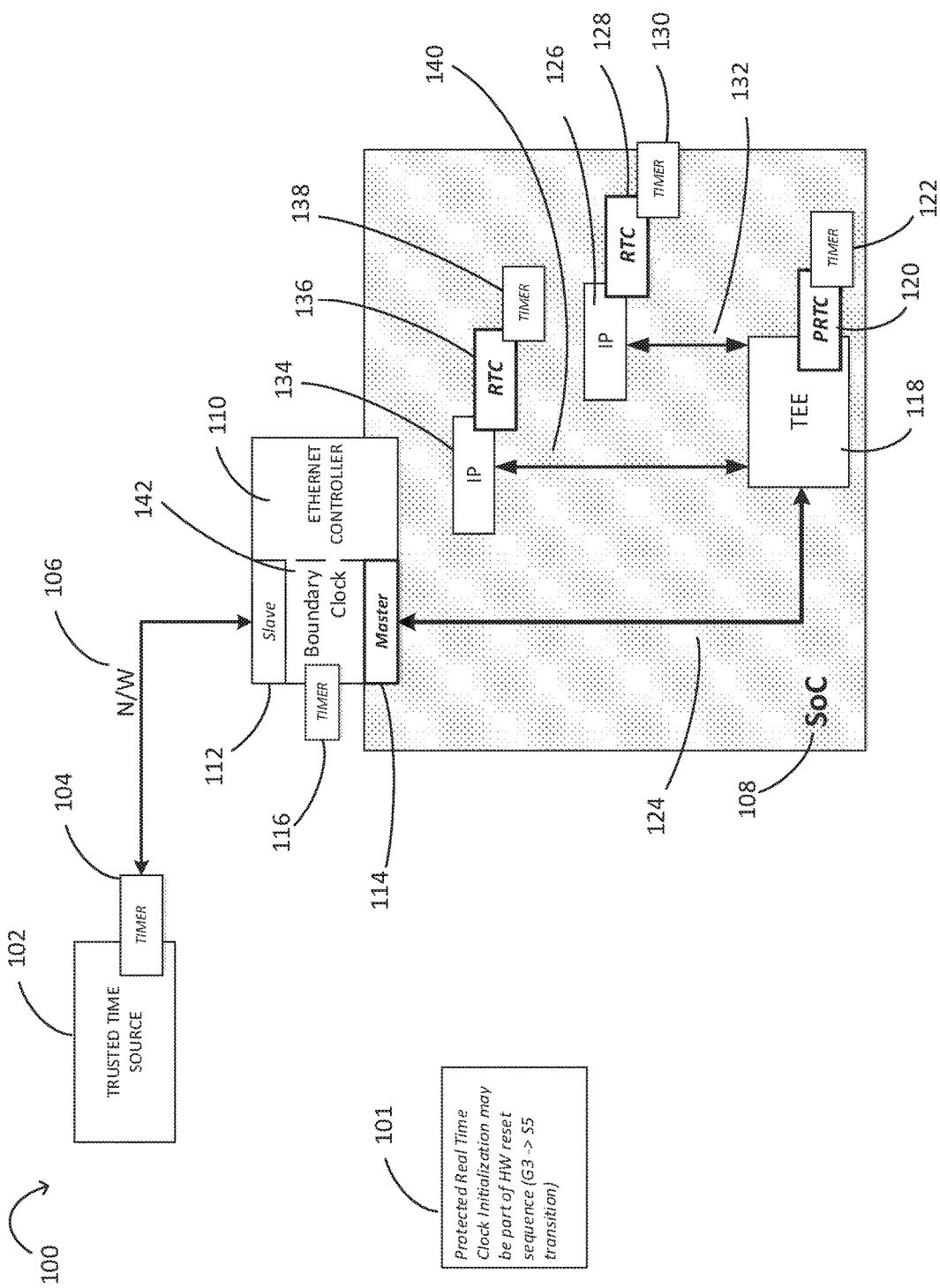
FIG. 1B is a more detailed block diagram of exemplary platform in FIG. 1A for initializing a protected real time clock, in accordance with various embodiments.

FIG. 1B is a more detailed block diagram of exemplary system 100 for initializing a PRTC on a SoC, even during a system hardware reset sequence. System 100 may include a trusted time source 102 with a timer 104, a network 106, and SoC 108. SoC 108 may include an Ethernet controller 110 having a boundary clock 142 with a slave clock 112, a master clock 114 and a timer 116, a trusted execution environment (TEE) 118 having a PRTC 120 and a timer 122, and hardware connection 124, among other elements. Ethernet controller 110 may include a boundary clock 142, which has a master port that is a duplicate of the slave clock timing, such that the master clock 114 is synchronized with the slave clock 112. This allows the boundary clock 142 to distribute time via a master clock 114 to the downstream PRTC 120 with common timing to the grandmaster or trusted time source 102.

FIG. 1B depicts a system capable of initializing PRTC 120 on the TEE during a system hardware reset sequence, G3 to S5 transition 101. G3 to S5 transition is system 100 transition from mechanical power off (G3) to shutdown state (S5) where all power to the host system is off but the power cord is still connected. System 100 may further include one or more integrated Intellectual Property (IP) agents or blocks 126, 134 that support the system G3 to S5 transition, each IP 126, 134 having a RTC 128, 136, a timer 130, 138, and hardware connections 132, 140.

TEE 118 may be any suitable trusted execution environment, such as Converged Security and Manageability Engine (CSME), which is secure firmware that powers the Intel® Active Management Technology (Intel® AMT) system. SoC 108 may include hardware connections between the master clock and TEE 118 as well as hardware connections between a TEE and other SoC components. For example, hardware connections may be integrated on-chip system fabric (IOSF), which are hardware connections on Intel® chips. As used herein, hardware, hardwire, and hardwired are used interchangeably to refer to physical connections within a system. TEE 118 may include a PRTC 120 and a timer 122. TEE 118 may be connected to master clock 114 via hardware connection 124. PRTC may include a controller (not shown) for initializing its clock and synchronizing time with a timer 122. PRTC 120 may function as the protected real time clock for SoC 108 and components 126, 134.

SoC 108 may include hardware connections 132, 140 to provide a standardized on-die interconnect protocol for connecting integrated IP agents 118, 126, 134 within a SoC. Such IP agents may be of varying types, including general-purpose processors such as in-order or out-of-order cores, fixed function units, graphics processors, IO controllers, display controllers, media processors, among many others. The integrated IPs may provide functionality such as compute capabilities, graphics capabilities, media processing capabilities, and data storage capabilities, among others. As used herein, IP, IP agent, agent, and integrated IP are used interchangeably. Hardware connections may include any suitable hardware connection, such as copper wire, copper traces, a bus, a hierarchical bus and a cascaded hub, among others.

For hardware connections based on IOSF, the IOSF may have multiple interfaces for each IP agent including, a primary interface and a sideband message interface, among others. According to the IOSF specification, an agent may support any combination of these interfaces. IOSF may include a hardware element that moves data between different IP agents. The IOSF and IOSF hardware element may be product specific. For example, the IOSF architecture may be implemented as a bus, a hierarchical bus, a cascaded hub, or so forth. The IOSF primary interface fabric may be used for all in-band communication, e.g., between a host processor such as a central processing unit (CPU) or other processor and an agent. The IOSF primary interface fabric may further enable communication of peer transactions between agents and supported fabrics. All transaction types including memory, input output (I/O), configuration, and in-band messaging can be delivered via primary interface fabric. The IOSF primary interface fabric may act as a high performance interface for data transferred between peers and/or communications with upstream components. In addition, the IOSF primary interface fabric may provide a mechanism for independent data flows throughout the system.

The IOSF sideband interface fabric may be a standard mechanism for communicating all out-of-band information. The IOSF sideband interface fabric may provide a point-to-point network with endpoints, routers, and a network to interconnect the routers and is intended to be low performance and in various embodiments may not support high bandwidth, low-latency, or performance critical data transfers between agents. In general, the IOSF sideband interface may be used to communicate non-performance critical information, rather than for performance critical data transfers, which typically may be communicated via primary interface. Although some embodiments are described herein in connection with the IOSF specification, the scope of the present invention is not limited in this regard and embodiments may be used in many different types of systems.

In FIG. 1B, slave clock 112 initializes and synchronizes to the trusted time source 102 according to IEEE 1588 protocol, or other secure protocol, via network 106. Master clock 114, which is synchronized to the slave clock on the Ethernet controller, and, in some embodiments, shares the same timer 116 as the slave clock 112, becomes the master clock to PRTC 120 on TEE 118. PRTC 120 initializes and synchronizes to master clock 114 via hardware connection 124. PRTC 120 becomes the master clock to RTCs 128, 136 on integrated IPs 126, 134, where RTCs 128, 136 initialize and synchronize to PRTC 120 and timer 122 via hardware connections 132, 140. As disclosed, the timing chain from trusted time source 102 (also referred to as the grandmaster clock) to slave clock 112 to master clock 114 to PRTC 120 to RTCs 128, 136 is via hardware connections to provide for secure initialization and synchronization of all clocks in the chain to the grandmaster clock.

In some embodiments, the initialization and synchronization of PRTC 120 may occur as part of hardware reset sequence 101. If IOSF connections are used, PRTC 120 initialization is preferably via IOSF sideband connections. During G3 to S5 transition, secure initialization of PRTC may occur as power to the system is off such that host system software, which may introduce problems with security and accuracy, is not involved. In some embodiments, IPs that support G3 to S5 system transition may initialize their RTCs 128, 136 to PRTC 120 via hardware connections 132, 140.

As disclosed herein, secure initialization and synchronization of time in a system may be maintained, especially when managed by solely trusted entities. For example, by initializing and synchronizing one or more boundary clocks in a secure IEEE 1588 slave device, such as Intel® embedded Ethernet controller on an integrated circuit, and then initializing a PRTC in a CSME over IOSF bus, the secure initialization and synchronization of time is assured. The MAC and CSME engines, which only load Intel signed firmware, may manage the initialization and synchronization of time for all integrated IPs by establishing a PRTC to which all RTCs initialize and synchronize via IOSF connections.

Figure 2:
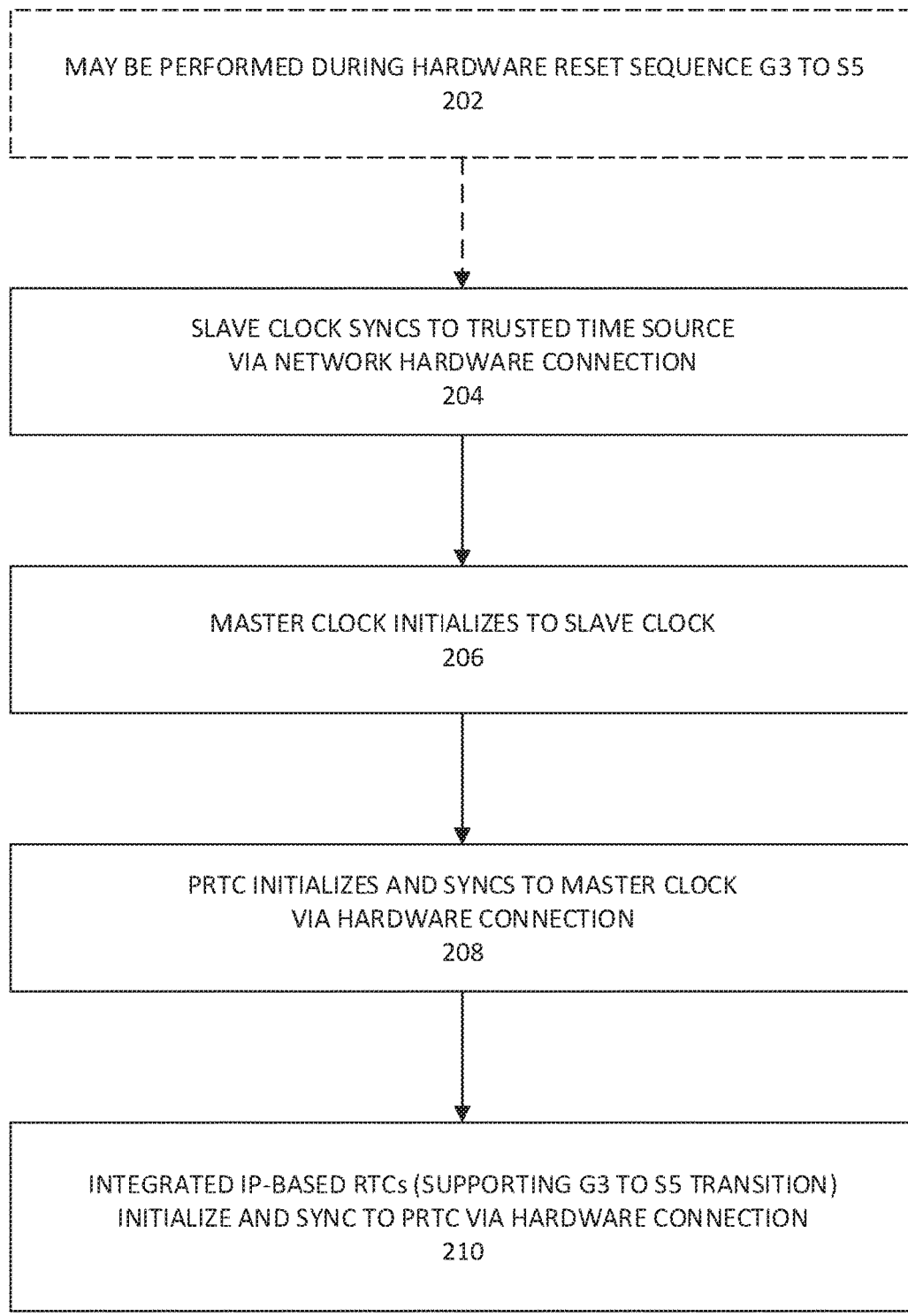
FIG. 2 is a flow diagram of an illustrative method for securely initializing a protected real time clock via a hardware connection, in accordance with various embodiments.

FIG. 2 is an exemplary method for initializing PRTC 120 of TEE 118 using hardware connections during a hardware reset sequence. At 202, the method may be performed early in the system hardware reset sequence, such as a system transition from G3 to S5. At 204, slave clock initializes to trusted time source clock via network hardware connection using, for example, standard IEEE 1588 protocol. At 206, master clock initializes to slave clock via a hardware connection. At 208, the PRTC initializes and synchronizes to the master clock via a hardware connection. At 210, integrated IPs that support G3 to S5 transitions may initialize and synchronize their RTCs to PRTC via hardware connections. If IOSF connections are used as hardware connections, the PRTC and RTCs may initialize via IOSF sideband connections as part of reset sequence via IOSF sideband message as part of reset sequence via IOSF sideband message.

As disclosed, PRTC initialization may occur during a system G3 to S5 transition, which is before any host system software is running (i.e., BIOS), using secure hardware to enhance time reliability and accuracy. Further, since time initialization occurs as part of the hardware reset sequence, a separate power source or battery is not necessary for a TEE-based PRTC. If the system loses power, the PRTC may be re-initialized as part of hardware reset sequence without the need to maintain time during power off. Since the system is not running normally during a G3 to S5 transition, only those IPs supporting the G3 to S5 transition will initialize and synchronize their RTCs.

Figure 3:
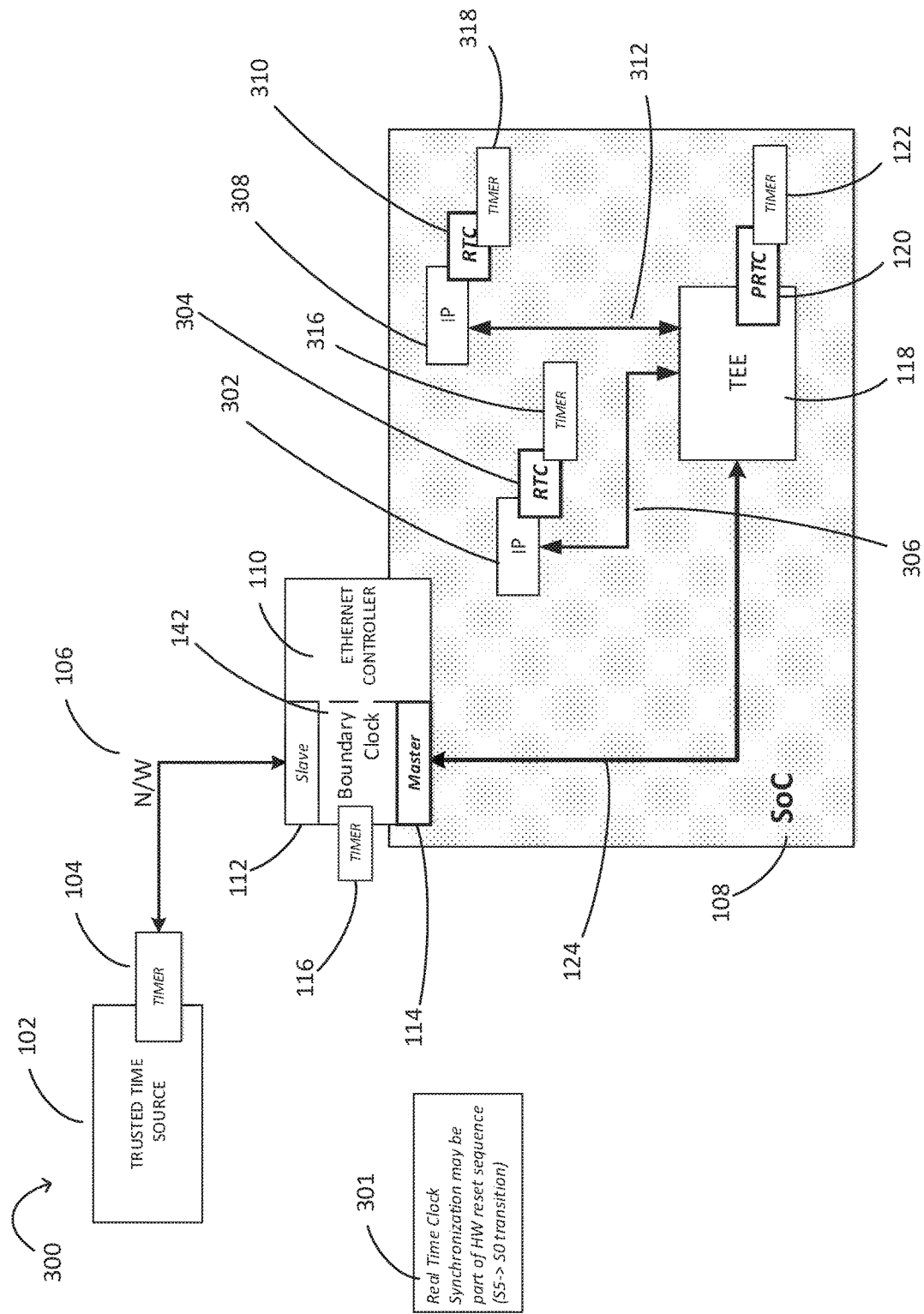
FIG. 3 is a simplified block diagram of an exemplary platform for synchronizing a protected real time clock via a hardware connection, in accordance with various embodiments.

FIG. 3 is a simplified block diagram of an exemplary system for synchronizing a TEE-based PRTC on a SoC, even during a system hardware reset sequence, Sx to S0 transition. A system hardware reset sequence may be defined as G3 to S0 transition or a subset of the transition, including G3 to S5 transition, S5 to S0 transition, or Sx to S0 transition. System 300 of FIG. 3 is system 100 of FIG. 1B when the system is undergoing S5 to S0 transition 301, as depicted by additional elements. S5 is a system state where all power to the host system is off but the power cord is still connected. S4 is a system state where the host CPU and memory are not active. S3, S2 and S1 are system states where the host CPU is not running but power is connected to the memory system. S0 is a system state where power is applied to all hardware devices and the system is running normally. For example, a host system BIOS will run after the system is in S0 state (or post-S0). Sx indicates any S state other than S0.

As shown in FIG. 3, system 300 may include elements of system 100 including a trusted time source 102 with a timer 104, a network 106, and SoC 108 having an Ethernet controller 110 having a boundary clock 142, a slave clock 112, a master clock 114 and a timer 116, TEE 118 with PRTC 120 and timer 122, and hardware connection 124, among other elements. In FIG. 3, system 300 may include additional integrated IPs 302, 308 having RTCs 304, 310 and timers 316, 318, and associated hardware connections 306, 312. The additional integrated IPs 302, 308 may support G3 to S5 transitions or may support any Sx-S0 transition.

When system 300 transitions from S5 to S0, PRTC 120 may synchronize to master clock 114 via hardware connection 124. Similarly, RTCs 304, 310 on integrated IPs 302, 308 may use hardware connections 306, 312 to initialize and synchronize RTCs 304, 310 to PRTC 120. Drift control (commonly referred to as synchronization) of PRTC may be managed by messaging TEE-based PRTC 120 to adjust timer 122 according to master clock timer 116. Drift control of RTCs may be managed by messaging IPs 302, 308 to adjust timers 316, 318 according to PRTC clock timer 122. The drift control messaging rate may be a function of the time accuracy required by the IPs and/or the accuracy of the PRTC. RTCs 304, 310 may include a controller (not shown) for initializing its clock and synchronizing time with a timer.

If IOSF connections are used as hardware connections, when system 300 transitions from S5 to S0, IOSF primary connections as well as IOSF sideband connections are available. PRTC 120 may synchronize to master clock 114 via IOSF sideband or may synchronize via IOSF primary. By switching to IOSF primary connections, PRTC 120 may enhance high-frequency drift control accuracy as IOSF primary is faster than IOSF sideband. Similarly, RTCs 304, 310 on integrated IPs 302, 308 may use IOSF primary to initialize and synchronize RTCs 304, 310 to PRTC 120. In some embodiments, IOSF sideband may be used to synchronize PRTC and RTCs.

Figure 4:
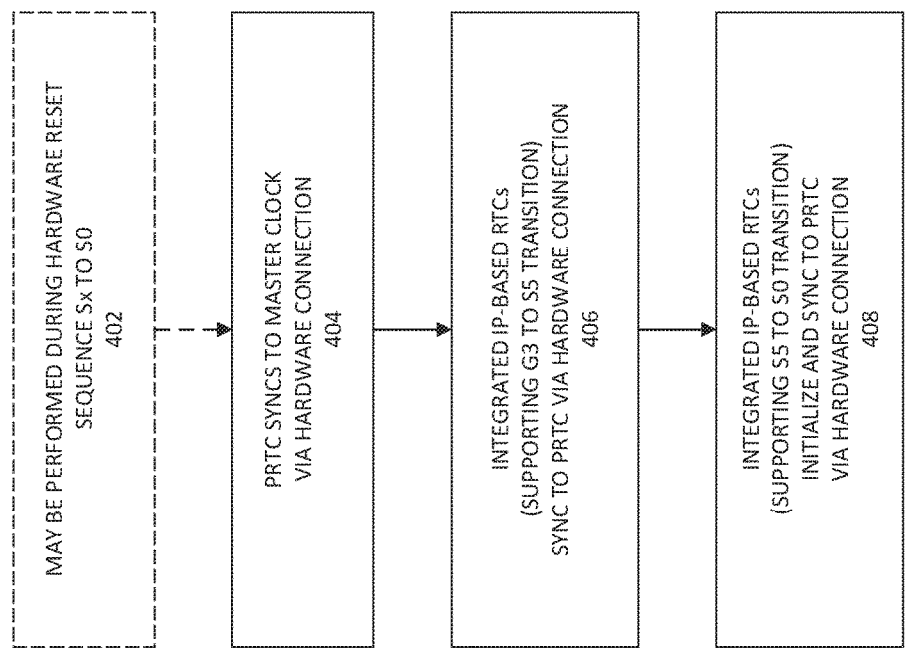
FIG. 4 is a flow diagram of an illustrative method for synchronizing a protected real time clock via a hardware connection, in accordance with various embodiments.

FIG. 4 is an exemplary method for synchronizing PRTC of a TEE and RTCs of integrated IPs having hardware connections during a system hardware reset sequence. At 402, the method may be performed during system transitions from S5 to S0, or from any other S state (Sx) to S0. At 404, PRTC synchronizes to master clock via a hardware connection. At 406, all integrated IPs that support G3 to S5 system transition may synchronize their RTCs to PRTC via hardware connections. At 408, all integrated IPs supporting S5 to S0 transitions initialize and synchronize their RTCs to PRTC via hardware connections. In some embodiments, initialization and synchronization at 404, 406, 408 may occur via IOSF primary. In some embodiments, initialization and synchronization at 404, 406, 408 may occur via IOSF sideband.

Figure 5:
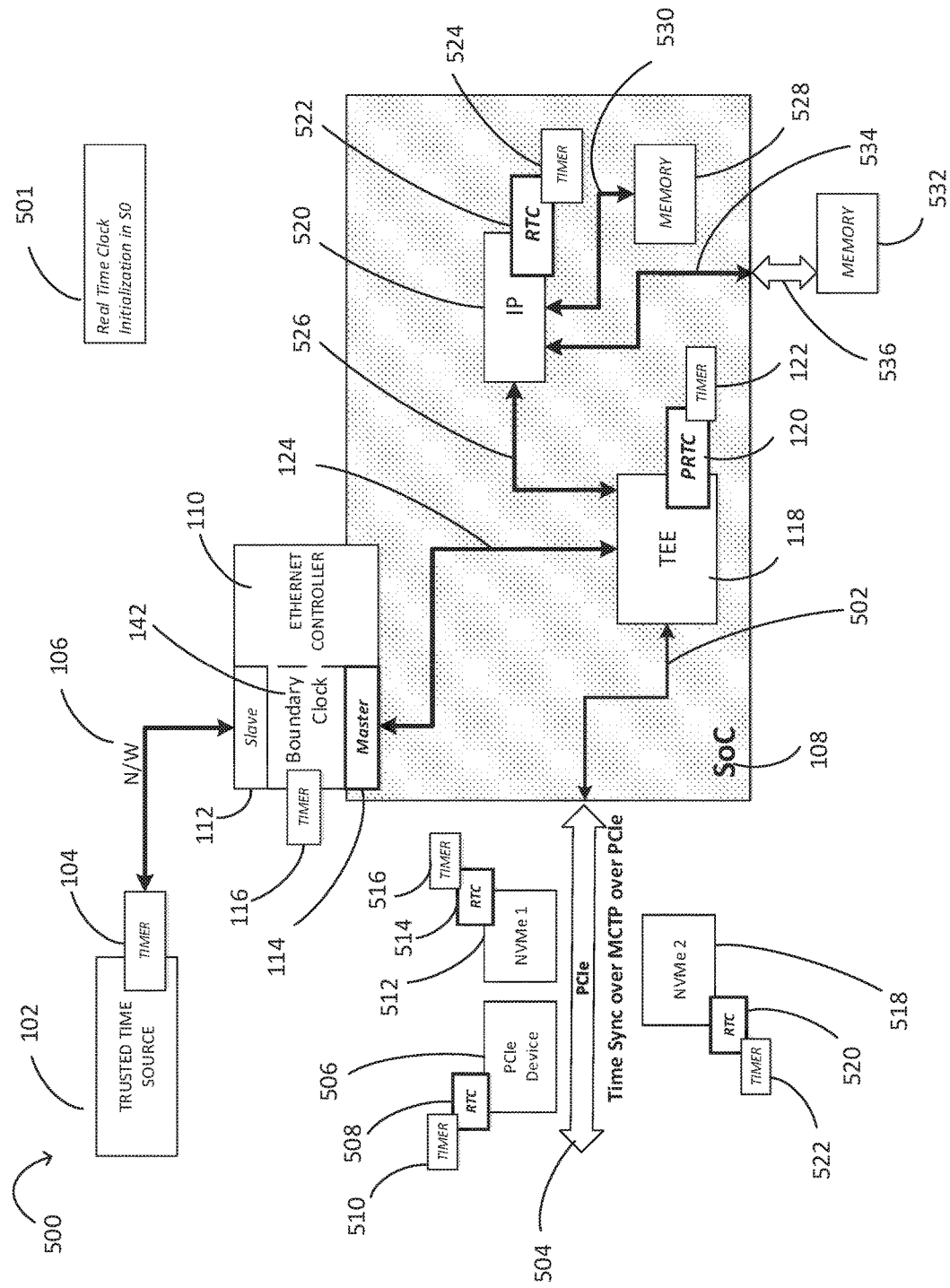
FIG. 5 is a simplified block diagram of an exemplary platform for initializing and synchronizing a discrete device real time clock to a protected real time clock via a hardware connection, in accordance with various embodiments.

FIG. 5 is a simplified block diagram of an exemplary system for initializing and synchronizing discrete devices connected to SoC once a system is running normally. System 500 of FIG. 5 is system 100 of FIG. 1B when the system is running normally 501 (i.e., in S0 state), so additional elements, specifically discrete devices, are depicted. Integrated SoC hardware connections may enable communication with other on-chip devices by communicating with a Peripheral Component Interconnect Express™ (PCIe) controller, which may communicate with various discrete devices. The integrated hardware connections on the SoC may include an IOSF interface, copper wire, copper traces, a bus, or the like. For the description of an example PCIe connection protocol, refer to the following reference: https://pcisig.com/sites/default/files/specification_documents/ECN_PTM_Revision1a_31_Mar_2013.pdf. As shown in FIG. 5, system 500 may include elements of system 100 including a trusted time source 102 having a timer 104, a network 106, and SoC 108 having an Ethernet controller 110 having a boundary clock 142 a slave clock 112, a master clock 114 and a timer 116, TEE 118 having PRTC 120 and timer 122, and hardware connection 124, among other elements. System 500 also may include discrete or peripheral devices 506, 512, 518 having RTCs 508, 514, 520 and timers 510, 516, 522 connected to PRTC 120 via hardware connection 502 and external PCIe connection 504 using Management Component Transport Protocol (MTCP). MTCP is software used by PCIe for encapsulating and sending data packets over PCIe connections. In some embodiments, non-PCIe connections may be used, such as Peripheral Component Interconnect (PCI) Local Bus or Ethernet connections. Peripheral devices may include, for example, non-volatile memory (NVMe) and other peripheral components, such as PCIe based application specific devices, including network acceleration processors and security processors. During system state S0, discrete devices 506, 512, 518 may initialize and synchronize to PRTC 120 via hardware connection 502 and PCIe 504 connections.

When system 500 transitions to S0 state, PRTC 120 is exposed as an MCTP end-point. All discrete devices 506, 512, 518, for example, PCIe based NVMe controllers, initialize and synchronize their RTCs 508, 512, 520 with PRTC 120 using MCTP protocol. In some embodiments, MCTP end-points may use a pre-shared key to encrypt the payload for security when initializing and synchronizing their RTCs.

FIG. 5 depicts another example of an integrated IP, such as a memory controller 520 that may be connected to integrated memory 528 and discrete memory 532 via hardware connection 530 and hardware connection/PCIe 534, 536, respectively. Memory 528, 532 may be any suitable type of memory for storing data, such as 3D XPoint by Intel and Micron Technology, Inc., among others. Memory controller 520 may initialize and synchronize its RTC 522 and timer 524 with TEE-based PRTC 120 via hardware connection 526 once system is in S0 state. Once RTC 522 has been initialized and synchronized, memory 528, 532 may timestamp data as it is stored according to RTC 522.

Figure 6:
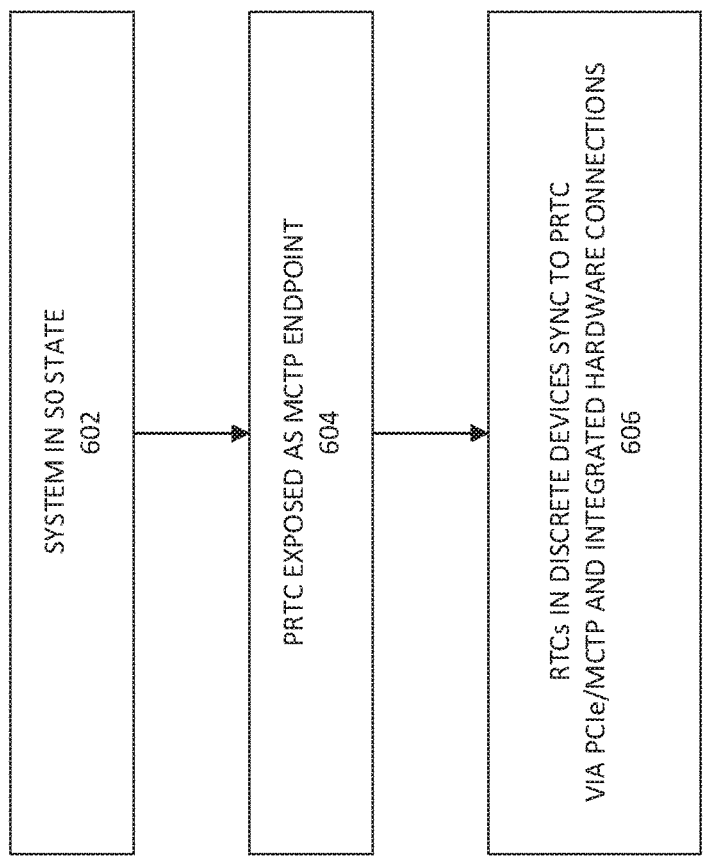
FIG. 6 is a flow diagram of an illustrative method for initializing and synchronizing a discrete device real time clock to a protected real time clock via a hardware connection, in accordance with various embodiments.

FIG. 6 is an exemplary method for initializing and synchronizing RTCs of discrete devices of SoC once system is running normally. At 602, system is in S0 state, where system power is applied to all hardware and system is running normally. At 604, Ethernet controller exposes TEE-based PRTC 120 as MCTP end-point such that discrete devices 506, 512, 518 may initialize and synchronize their RTCs 508, 514, 520 with PRTC 120 via hardware connections and PCIe connections using MCTP protocol. In some embodiments, once a discrete device has initialized its RTC, a discrete device may timestamp data using its RTC. For example, NVMe1 512 may store data blocks and timestamp according to its RTC 514 when data was stored.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The terms "a" or "an" as used herein, as is common in patent documents, include one or more than one, independent of any other instances or usages of "at least one" or "one or more."

The above description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

OTHER NOTES AND EXAMPLES

Each of these non-limiting examples may stand on its own, or may be combined in various permutations or combinations with one or more of the other examples.

Example 1 is a method for initializing a protected real time clock on a trusted execution environment on a system on a chip, the method including: initializing a slave clock to a trusted time source via a network hardware connection; initializing a master clock to the slave clock; and initializing the protected real time clock to the master clock via a hardware connection.

Example 2 may include the subject matter of Example 1, and may further include initializing a real time clock on the integrated intellectual property agent to the protected real time clock via a hardware connection.

Example 3 may include the subject matter of any of Examples 1-2, and may further include synchronizing the protected real time clock to the master clock via a hardware connection.

Example 4 may include the subject matter of any of Examples 1-3, and may further include synchronizing the real time clock to the protected real time clock via a hardware connection.

Example 5 may include the subject matter of any of Examples 1-4, and may further specify that initializing the protected real time clock occurs during a G3 to S5 system transition.

Example 6 may include the subject matter of any of Examples 1-4, and may further include initializing and synchronizing a real time clock on a discrete device to the protected real time clock via a hardware connection.

Example 7 may include the subject matter of any of Examples 3-4, and may further specify that the hardware connection is a primary integrated on-chip system fabric connection.

Example 8 may include the subject matter of Example 1, and may further specify that the hardware connection is a sideband integrated on-chip system fabric connection.

Example 9 may include the subject matter of any of Examples 3-4, and may further specify that synchronizing occurs during S5 to S0 system transition.

Example 10 may include the subject matter of any of Examples 4-9, and may further include timestamping intellectual property agent functionality using the real time clock time.

Example 11 is a system for initializing a protected real time clock on a trusted execution environment on a system on a chip, the system including: a trusted time source; a system on a chip including: an Ethernet controller including: a slave clock initialized and synchronized to the trusted time source; a timer; and a master clock initialized and synchronized to the slave clock; a protected real time clock on a trusted execution environment, wherein the protected real time clock is in communication with the master clock via a hardware connection; and a network, wherein the network connects the trusted time source to the slave clock via a hardware connection.

Example 12 may include the subject matter of Example 11, and the system on a chip may further include: a real time clock on an integrated intellectual property agent, wherein the real time clock is in communication with the protected real time clock via a hardware connection.

Example 13 may include the subject matter of any of Examples 11-12, and the system on a chip may further include: a real time clock on a discrete device, wherein the real time clock is in communication with the protected real time clock via a hardware connection.

Example 14 is a system for initializing a protected real time clock on a trusted execution environment on a system on a chip, the system configured to: initialize a slave clock to a trusted time source via a network hardware connection; initialize a master clock to the slave clock; and initialize the protected real time clock to the master clock via a hardware connection.

Example 15 may include the subject matter of Example 14, and further may be configured to: initialize a real time clock on an integrated intellectual property agent to the protected real time clock via a hardware connection.

Example 16 may include the subject matter of any of Examples 14-15, and further may be configured to: synchronize the protected real time clock to the master clock via a hardware connection.

Example 17 may include the subject matter of any of Examples 14-16, and further may be configured to: synchronize the real time clock to the protected real time clock via a hardware connection.

Example 18 may include the subject matter of any of Examples 14-17, and further may be configured to: initialize and synchronize a real time clock on a discrete device to the protected real time clock via a hardware connection.

Example 19 may include the subject matter of any of Examples 16-17, and may further specify that the hardware connection is a primary integrated on-chip system fabric connection.

Example 20 may include the subject matter of any of Examples 14-15, and may further specify that the hardware connection is a sideband integrated on-chip system fabric connection.

Example 21 may include the subject matter of Example 14, and may further specify that initializing the protected real time clock occurs during G3 to S5 system transition.

Example 22 may include the subject matter of any of Examples 16-17, and may further specify that synchronizing the protected real time clock and synchronizing the real time clock occurs during S5 to S0 system transition.

Example 23 may include the subject matter of Example 17, and further may be configured to: timestamp intellectual property agent functionality using the real time clock time.

Example 24 is a at least one machine readable medium comprising one or more instructions that when executed by at least one processor, cause the at least one processor to: initialize a slave clock to a trusted time source via a network hardware connection; initialize a master clock to the slave clock; and initialize a protected real time clock to the master clock via a hardware connection.

Example 25 may include the subject matter of Example 24, and may further include one or more instructions that when executed by the at least one processor, cause the at least one processor to: initialize a real time clock on an integrated intellectual property agent to the protected real time clock via a hardware connection.

Example 26 may include the subject matter of Example 25, and may further include one or more instructions that when executed by the at least one processor, cause the at least one processor to: synchronize the protected real time clock to the master clock via a hardware connection.

Example 27 may include the subject matter of Example 26, and may further include one or more instructions that when executed by the at least one processor, cause the at least one processor to: synchronize the real time clock to the protected real time clock via a hardware connection.

Example 28 may include the subject matter of Example 24, and may further include one or more instructions that when executed by the at least one processor, cause the at least one processor to: initialize and synchronize a real time clock on a discrete device to the protected real time clock via a hardware connection.

Example 29 may include the subject matter of any of Examples 26-27, and may further specify that the hardware connection is a primary integrated on-chip system fabric connection.

Example 30 may include the subject matter of any of Examples 24-25, and may further specify that the hardware connection is a sideband integrated on-chip system fabric connection.

Example 31 may include the subject matter of Example 24, and may further specify that initializing the protected real time clock occurs during G3 to S5 system transition.

Example 32 may include the subject matter of any of Examples 26-27, and may further specify that synchronizing the protected real time clock occurs during S5 to S0 system transition.

Example 33 may include the subject matter of any of Examples 25-32, and may further include one or more instructions that when executed by the at least one processor, cause the at least one processor to: timestamp intellectual property agent functionality using the real time clock time.

Example 34 is a system including: means for initializing a slave clock to a trusted time source via a network hardware connection; means for initializing a master clock to the slave clock; and means for initializing the protected real time clock to the master clock via a hardware connection.

Example 35 may include the subject matter of Example 34, and may further include: means for initializing the real time clock to the protected real time clock via a hardware connection.

Example 36 may include the subject matter of Example 35, and may further include: means for synchronizing the protected real time clock to the master clock via a hardware connection.

Example 37 may include the subject matter of Example 36, and may further include: means for synchronizing the real time clock to the protected real time clock via a hardware connection.

Example 38 may include the subject matter of Example 37, and may further include: means for timestamping intellectual property agent functionality using the real time clock time.

Example 39 may include the subject matter of Example 37, and may further include: means for initializing and synchronizing a real time clock on a discrete device to the protected real time clock via a hardware connection.

Example 40 may include the subject matter of Example 39, and may further include: means for timestamping discrete device functionality using the real time clock time.

Example 41 is a system including means for performing the method of any of claims 1-10.

Example 42 may include the subject matter of Example 38, and may further specify that the means comprise machine-readable code that when executed, cause a machine to perform one or more steps of the method of any of claims 1-10.

What is claimed is:

1. A method for initializing a protected real time clock on a trusted execution environment on a system on a chip, the method comprising:
   initializing a slave clock to a trusted time source via a network hardware connection;
   initializing a master clock to the slave clock; and
   initializing the protected real time clock to the master clock via a hardware connection, wherein the protected real time clock is on the trusted execution environment on the system on a chip.

2. The method of claim 1, further comprising:
   initializing a real time clock on the integrated intellectual property agent to the protected real time clock via a hardware connection.

3. The method of claim 1, further comprising:
   synchronizing the protected real time clock to the master clock via a hardware connection.

4. The method of claim 2, further comprising:
   synchronizing the real time clock to the protected real time clock via a hardware connection.

5. The method of claim 1, wherein initializing the protected real time clock occurs during G3 to S5 system transition.

6. The method of claim 1, further comprising:
   initializing and synchronizing a real time clock on a discrete device to the protected real time clock via a hardware connection.

7. The method of claim 3, wherein the hardware connection is a primary integrated on-chip system fabric connection.

8. The method of claim 1, wherein the hardware connection is a sideband integrated on-chip system fabric connection.

9. The method of claim 1, wherein synchronizing occurs during S5 to S0 system transition.

10. The method of claim 4, further comprising:
    timestamping intellectual property agent functionality using the real time clock time.

11. A system for initializing a protected real time clock on a trusted execution environment on a system on a chip, the system comprising:
    a trusted time source;
    the system on a chip comprising:
      an Ethernet controller comprising:
        a slave clock initialized and synchronized to the trusted time source;
        a timer; and
        a master clock initialized and synchronized to the slave clock;
      the protected real time clock on the trusted execution environment, wherein the protected real time clock is in communication with the master clock via a hardware connection; and
    a network, wherein the network connects the trusted time source to the slave clock via a hardware connection.

12. The system of claim 11, the system on a chip further comprising:
    a real time clock on an integrated intellectual property agent, wherein the real time clock is in communication with the protected real time clock via a hardware connection.

13. The system of claim 11, the system on a chip further comprising:
    a real time clock on a discrete device, wherein the real time clock is in communication with the protected real time clock via a hardware connection.

14. A system for initializing a protected real time clock on a trusted execution environment on a system on a chip, the system configured to:
    initialize a slave clock to a trusted time source via a network hardware connection;
    initialize a master clock to the slave clock; and
    initialize the protected real time clock to the master clock via a hardware connection, wherein the protected real time clock is on the trusted execution environment on the system on a chip.

15. The system of claim 14, further configured to:
    initialize a real time clock on an integrated intellectual property agent to the protected real time clock via a hardware connection.

16. The system of claim 14, further configured to:
    synchronize the protected real time clock to the master clock via a hardware connection.

17. The system of claim 16, further configured to:
    synchronize the real time clock to the protected real time clock via a hardware connection.

18. The system of claim 14, further configured to:
    initialize and synchronize a real time clock on a discrete device to the protected real time clock via a hardware connection.

19. The system of claim 16, wherein the hardware connection is a primary integrated on-chip system fabric connection.

20. The system of claim 14, wherein the hardware connection is a sideband integrated on-chip system fabric connection.

21. The system of claim 14, wherein initializing the protected real time clock occurs during G3 to S5 system transition.

22. The system of claim 17, wherein synchronizing the protected real time clock and synchronizing the real time clock occurs during S5 to S0 system transition.

23. The system of claim 17, further configured to:
    timestamp intellectual property agent functionality using the real time clock time.

24. A system comprising:
    means for initializing a slave clock to a trusted time source via a network hardware connection;
    means for initializing a master clock to the slave clock; and
    means for initializing the protected real time clock to the master clock via a hardware connection.

25. The system of claim 24, further comprising:
    means for initializing a real time clock on an integrated intellectual property agent to the protected real time clock via a hardware connection.

* * * * *